July 17, 1962  E. WARNER  3,044,896

METHOD OF MAKING CAST COATED PAPER

Filed March 4, 1959

Inventor
EDGAR WARNER

Attorney

United States Patent Office 3,044,896
Patented July 17, 1962

3,044,896
METHOD OF MAKING CAST COATED PAPER
Edgar Warner, Middletown, Ohio, assignor to Champion Papers, Inc., Hamilton, Ohio, a corporation of Ohio
Filed Mar. 4, 1959, Ser. No. 797,123
4 Claims. (Cl. 117—64)

This invention is concerned with coated substrates and a method of coating such substrates. In particular, the invention is concerned with a method of manufacture of cast coated papers and is an improvement upon the process disclosed and claimed in application S.N. 324,934 of Edgar Warner, now U.S. Patent No. 2,802,572.

Cast coated papers have found widespread acceptance in the printing industry because such papers are provided with a more uniform print receptive surface than either uncoated or machine coated papers. Cast coated papers are also distinguished in the fact that the coated surface is exceptionally absorbent, as distinguished from machine coated papers which are often calendered after coating.

In some cases, particularly where the use of so-called "high gloss" inks are employed, it is desirable to reduce the absorbency of the coating below that considered normal for cast coated papers. This is desirable to improve the gloss ink holdout, i.e., to reduce the degree of penetration of the high gloss ink into the coating, since high gloss inks lose gloss when they penetrate the coating.

While it is true that ink formulas have been developed for producing high gloss when applied to cast coated paper, nonetheless it is often desirable to decrease the absorbency of the coating to avoid the complications arising from the need to compound special fast setting inks for different applications. If then the absorbency of the coating is reduced it is quite possible to produce a cast coated paper which is uniform in quality and which may be used with more normal ink formulas and still give better than average gloss ink holdout.

It has been found that the gloss ink holdout can be improved, i.e., the coating may be rendered less absorbent if more than normal amounts of adhesive are added to the coating, which is generally comprised of an aqueous suspension of a mineral pigment and a suitable adhesive such as casein or the like. However, increase in adhesive content of the coatings immediately presents a problem because the expense of the adhesive may increase as much as 50% over that considered normal. Even more significant is the fact that increases in adhesive content of the coating result in reduced production because the coatings become progressively harder and harder to dry as a direct function of increased amounts of adhesive.

The present invention contemplates, therefore, a method of producing cast coated paper having desirable printing qualities and improved gloss ink holdout, but wherein the manufacturing costs of the paper are not materially increased but in some cases may be lessened due to reduction in the use of relatively expensive adhesives. The practice of the invention finds application in the method of cast coating paper which is shown and described in Patent 1,719,166, issued July 2, 1929, to Donald Bradner.

Accordingly, an object of the invention is to produce cast coated paper at a reasonable cost.

A further object of the invention resides in a method of manufacture of cast coated paper having desirable and controlled absorbency.

Another object of the invention is to produce a cast coated paper having the desired ink absorbency characteristics more economically than such paper has been heretofore produced.

These and other objects of the invention may be accomplished by applying an initial coating to a suitable raw stock, troweling or doctoring the initial coating into the interstices thereof, and thereafter, while the initial coating is still plastic or thoroughly wet, furnishing a second application of coating to the paper and thereafter drying the coating into a homogeneous mass against a polished non-adherent metal surface. By practicing the invention in the manner outlined it has been found that the desired gloss ink holdout properties of the cast coated surface may be obtained without an increase in adhesive content of the coating and without appreciable loss in production rates. The resultant product is distinguished by the uniform absorbency of the coating applied, and by its "gloss ink holdout," i.e., the ability of the coating to resist penetration by high gloss inks which must generally dry on the surface of the coating to produce maximum gloss properties.

The practice of applying a precoat to a raw stock is well known. Such practice is often resorted to where a raw stock is not possessed of the most desirable characteristics, that is, the raw stock formation is irregular, the surface of the raw stock being spiny or the like. In such cases it has been the practice to apply a precoat to the raw stock before the final coating is applied as a separate operation. In other cases the precoating is applied prior to the final coating as a part of a continuous operation. In most cases, however, except as disclosed in aforesaid application, the time interval between first and second applications of the coating is such that the initial coating is allowed to "set" or partially dry before the final coating is applied. The present invention, however, is in direct contradiction to the practice of drying a doctored precoat. In effecting the present invention, the practice is to apply the doctored or troweled final coating while the precoating is wet, long before it becomes dry, and in so doing it has been found that not only is the coated surface produced more uniform throughout but a cast coated paper having exceptional gloss ink holdout may be made using normal amounts of adhesive and at normal production rates.

Referring now to the attached drawings it may be seen that:

Figure 1:
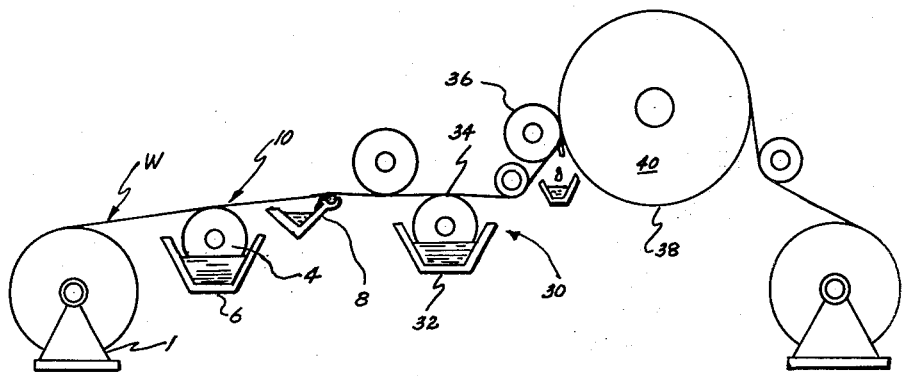
FIG. 1 is a schematic view of one manner of carrying out the present invention as applied to the cast coating of paper.
Figure 2:
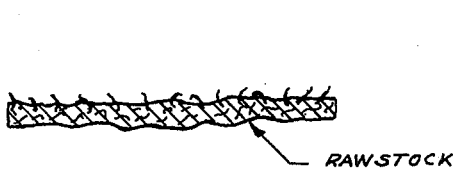
FIG. 2 is an enlarged sectional view of a paper substrate illustrating the appearance of the coated substrate immediately prior to application of the precoat.
Figure 3:
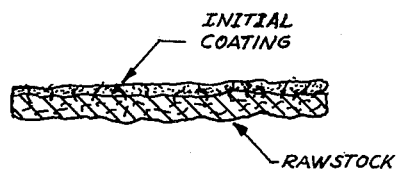
FIG. 3 is a view similar to FIG. 2 but showing the precoat as it appears a short few seconds after the precoating has been applied.
Figure 4:
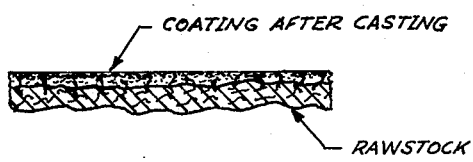
FIG. 4 is a view similar to FIG. 3, illustrating the appearance of the substrate after the final coating is applied.

Considering in particular FIG. 1, it will be seen that therein is disclosed one manner of cast coating a paper substrate utilizing the principles of the present invention. A suitable web W of a paper substrate is unwound from a roll at unwind stand 1. From the unwind stand the substrate passes to a precoater 10 comprised of an applicator roll 4 rotating in a suitable coating pan 6. Preferably, the pan 6 is filled with a coating slurry of above 50% total solids of a mineral pigment suspended in an aqueous dispersion of an adhesive. The applicator roll 4 transfers a continual application of an excess of coating from the pan to the web W. Immediately thereafter the web W passes over a form of metering and doctoring device, in this case shown as a doctor blade 8, wherein the applied coating is smoothed and the excess coating removed. The web W continues its movement until it enters a cast coating apparatus 30 wherein its surface again receives an application of coating from rotating applicator roll 34 revolving in coating pan 32. The coating thus applied is not doctored in the sense that it is troweled but rather is carried into the nip defined between a press roll 36 and a polished nonadherent surface 38 defined on a revolving drum or endless belt illustrated generally as 40 and caused to squeeze or flow from the surface. The nonadherent surface is heated and thus it defines a drying device against which the coated substrate is dried, the surface of the applied coating being a mirror image of the polished surface against which it is dried. The cast coating step in the process is described in the aforesaid Bradner patent and also in Patent 2,316,202.

Having described the manner in which the process may be carried out, consideration will be given to the details and mechanism of the process itself. Since the initial or precoat is applied in the form of a high total solids slurry it will be apparent that there is a minimum of moisture to be removed by evaporation and absorption of moisture into the substrate. Therefore it is necessary that the precoating be formed on the substrate promptly since an essential consideration in the process is that the initial coating fulfill its purpose of forming a proper base for the final coating yet it must still be wet to the degree that migration of the adhesive content of the final coat into the base coat is prevented. To accomplish this where the substrate is of such characteristics the base or precoat is troweled onto the substrate to fill the interstices of the paper and press a saturated, non-absorbent coating layer to the following coating applicator. Thereafter, as soon as possible, while the troweled, or doctored coating is still saturated with water, the final coating is applied and the substrate pressed against the polished surface, where drying is begun.

Since the coatings contain primarily an adhesive examples of which are casein, glue or starch all hydrophilic in nature and a mineral pigment examples of which are clay, satin white calcium carbonate, etc. suspended or dispersed in water, it has been found that if the water can be held in the base coat adjacent the surface thereof and the final coating applied and thereafter the coatings dried simultaneously, the greater portion of the adhesive in the second coat will "set" adjacent the "cast" surface with the net result that the printing qualities of the resultant product are similar to that obtained by the use of very high adhesive content coatings in the more normal cast coating operations, i.e., without an immediately preceding precoating and doctoring step.

It will be seen, then, that in the method described the precoat of a mineral pigment and an adhesive in an aqueous medium are applied to the substrate, immediately doctored to remove excess coating, yet leave a saturated, hence relatively non-absorbent precoat which is then passed directly to a second coating operation and, with both coatings still wet, pressed and dried against a metal surface, preferably heated, whereby the adhesive content of the top or final coating is set immediately against the coating surface to reduce the ink absorbency of the coating.

This same result cannot be obtained in the ordinary methods of precoating and final coating because in most every case the precoating is dried or, at the least, partially dried before the final coating is added or because, the coating has been thoroughly scrubbed into the substrate. With the precoating in the dry or partially dry state or scrubbed into the paper substrate the second coating loses its adhesive content due to migration of the adhesive into the first coating. The basic distinction then, between previous coating methods and the present invention resides in the fact that, contrary to ordinary practice, the final or top coating should be applied to the doctoring or troweled first coating application as soon as possible to preclude any substantial loss of moisture from the first coat, in order to minimize the migration of adhesive away from the surface of the final coating before it is set.

Thus, since maximum benefit is derived from the adhesive adjacent the surface of the coating, it has been found that by practicing the invention as outlined above cast coated paper having improved gloss ink holdout may be manufactured without substantial loss in production rates and without the addition of excessive amounts of adhesive.

Preferably, in the practice of the invention, the second coating is much more dilute than the initial coating to effect a proper flowing in the nip formed between the press roll and the casting surface, though in some cases the coatings are applied at the same consistency, i.e., same total solids.

In the foregoing description of the novel method of cost coating a substrate, reference has been made to paper substrates. The word paper is not intended to be limiting in the sense that it is used in the industry, but rather, is used in a broad sense to indicate a substrate which may be formed of fibers deposited and matted on a cylinder or fourdrinier machine and to include therein "board" and other products.

Having thus described a novel coating method it will be apparent that the spirit and scope of the inventive concept is limited only to the extent defined in the claims following, wherein what is claimed is:

1. A method of manufacturing cast coated paper having controlled surface absorbency characteristics comprising the steps of applying a coating comprised of an aqueous suspension of a mineral pigment and a water dispersible, hydrophilic adhesive to a paper substrate, thereafter doctoring said applied coating to remove excess coating from said substrate, while leaving the base coating on said substrate in a water saturated condition and thereafter immediately applying a second coating application of similar constituent composition of said saturated base coating and finally drying said applied coating while immobile against a metal casting surface.

2. A process of manufacturing cast coated paper as defined in claim 1 wherein said first applied coating is at a total solids content of greater than 50% and wherein said second applied coating characterized in that its total solids content is substantially less than that of said first applied coating.

3. A method of manufacturing cast coated paper having a reduced affinity for high-gloss ink comprising the steps of applying to a paper substrate a first coating including an aqueous suspension of a mineral pigment and a water dispersible hydrophilic adhesive to the surface thereof, thereafter troweling said first applied coating, and finally depositing a further coating of similar constituents of said first applied coating immediately following the application thereof while the moisture content of said first applied coating is such as to prevent migration of the adhesive content of said second applied coating into said first applied coating, and thereafter drying the total coating applied against a polished casting surface whereby after said coating is dried in adherent contact therewith, the adhesive content of said second applied coating is set adjacent the cast surface of the coated substrate.

4. The process of manufacturing cast coated papers as defined in claim 3 wherein said first applied coating is applied at a total solids content of greater than 50% and wherein said second applied coating is characteristic in that its total solids content is less than that of said first applied coating.

References Cited in the file of this patent

UNITED STATES PATENTS

| | | |
|---|---|---|
| 2,204,600 | Kabela et al. | June 18, 1940 |
| 2,214,565 | Montgomery et al. | Sept. 10, 1940 |
| 2,286,259 | Cagle | June 16, 1942 |
| 2,790,730 | Trosset | Apr. 30, 1957 |
| 2,819,184 | Smith et al. | Jan. 7, 1958 |